US008039789B2

(12) United States Patent
Gorczyca et al.

(10) Patent No.: US 8,039,789 B2
(45) Date of Patent: Oct. 18, 2011

(54) METHOD AND APPARATUS FOR SELF CALIBRATING METER MOVEMENT FOR IONIZATION POWER SUPPLIES

(75) Inventors: John A. Gorczyca, Lansdale, PA (US); Manuel C. Blanco, Hillsborough, NJ (US); Steven J. Mandrachia, Eagleville, PA (US)

(73) Assignee: Illinois Tool Works Inc., Glenview, IL (US)

( * ) Notice: Subject to any disclaimer, the term of this patent is extended or adjusted under 35 U.S.C. 154(b) by 555 days.

(21) Appl. No.: 12/266,102

(22) Filed: Nov. 6, 2008

(65) Prior Publication Data

US 2009/0127452 A1 May 21, 2009

Related U.S. Application Data

(60) Provisional application No. 61/003,797, filed on Nov. 19, 2007.

(51) Int. Cl.
*G01D 18/00* (2006.01)

(52) U.S. Cl. .................................................... 250/252.1
(58) Field of Classification Search ................ 250/252.1
See application file for complete search history.

(56) References Cited

U.S. PATENT DOCUMENTS 5,703,360 A * 12/1997 Fischer et al. ................ 250/288
7,238,956 B2 * 7/2007 Gierak et al. .............. 250/493.1

* cited by examiner

*Primary Examiner* — Kiho Kim
(74) *Attorney, Agent, or Firm* — Panitch Schwarze Belisario & Nadel LLP

(57) ABSTRACT

A method of determining a relative condition of an ionizer in an ionization system includes placing the ionization system in a calibration mode, stepping the ionization system through one or more of a range of adjustments, collecting calibration data at each step and storing the calibration data in a memory, placing the ionization system in an operating mode, collecting real-time data regarding an output of the ionization system, comparing the real-time data to the calibration data and determining difference values therebetween, and using the difference values to determine the relative condition of the ionizer.

26 Claims, 6 Drawing Sheets

METER MOVEMENT / ALLOWABLE DIFFERENCES

600

| BASELINE VALUES / ADJUSTMENT RANGES PROCESSOR CONFIGURED OUTPUTS | | | | | | | | | |
|---|---|---|---|---|---|---|---|---|---|
| | | OUTPUT LEVEL | | UPPER LIMIT | | LOWER LIMIT | | | |
| OPERATING MODE | FREQ | POS AMP (kV) | NEG AMP (kV) | POS LIMIT (kV) | NEG LIMIT (kV) | POS LIMIT (kV) | NEG LIMIT (kV) | AMP RESOLUTION | TIME RESOLUTION |
| SPEED | 45HZ | 7 | -7 | 13 | 13 | 3.5 | 3.5 | 14BIT | 50uSEC |
| HYBRID | 15HZ | 9 | -9 | 18 | 18 | 3.5 | 3.5 | 14BIT | 50uSEC |
| DISTANCE | 7.5HZ | 12 | -12 | 18 | 18 | 3.5 | 3.5 | 14BIT | 50uSEC |

Fig. 6

METHOD AND APPARATUS FOR SELF CALIBRATING METER MOVEMENT FOR IONIZATION POWER SUPPLIES

CROSS-REFERENCE TO RELATED APPLICATIONS

This application claims the benefit of U.S. Provisional Patent Application No. 61/003,797, filed on Nov. 19, 2007, entitled "Method And Apparatus For Self Calibrating Meter Movement For Ionization Power Supplies," the entire contents of which are incorporated by reference herein.

BACKGROUND OF THE INVENTION

Air ionization is an effective method of creating or eliminating static charges on non-conductive materials and isolated conductors. Air ionizers generate large quantities of positive and negative ions in the surrounding atmosphere that serve as mobile carriers of charge in the air. As ions flow through the air, they are attracted to oppositely charged particles and surfaces. Creation or neutralization of electrostatically charged surfaces can be rapidly achieved through this process.

Air ionization may be performed using electrical ionizers, which generate ions in a process known as corona discharge. Electrical ionizers generate air ions by intensifying an electric field around a sharp point until the field overcomes the dielectric strength of the surrounding air. Negative corona discharge occurs when electrons are flowing from the electrode into the surrounding air. Positive corona discharge occurs as a result of the flow of electrons from the air molecules into the electrode.

Ionizer devices, such as an electrostatic charging system, an ionization system, or an alternating current (AC) or direct current (DC) charge neutralizing system, take many forms, such as ionizing bars, air ionization blowers, air ionization nozzles, and the like, and are utilized to create or neutralize static electrical charge by emitting positive and negative ions into the workspace or onto the surface of an area. Ionizing bars are typically used in continuous web operations such as paper printing, polymeric sheet material, or plastic bag fabrication. Air ionization blower and nozzles are typically used in workspaces for assembling electronics equipment such as hard disk drives, integrated circuits, and the like, that are sensitive to electrostatic discharge (ESD). Electrostatic charging systems are typically used for pinning together paper products such as magazines or loose leaf paper.

Ionizers typically include at least one ionization emitter that is powered by a high voltage power supply. The charge produced by the ionization emitter is proportional to the current flowing through the high voltage supply into the ionization emitter. Over time, an ionizer may accumulate debris. In order to maintain optimal the performance of the ionizer, it is necessary to clean the ionizer in order to remove the debris. As an ionizer accumulates debris, the ionizer's charge will decrease and, therefore, the current flowing from the voltage supply into the ionizer will also decrease. Conventionally, the current flowing through the voltage supply into the ionizer can be measured by using the return leg of the high voltage transformer or supply, which allows the sum current from the supply to be measured.

BRIEF SUMMARY OF THE INVENTION

Briefly stated, an embodiment of the present invention comprises a method of determining a relative condition of an ionizer in an ionization system. The method includes placing the ionization system in a calibration mode, stepping the ionization system through one or more of a range of adjustments, collecting calibration data at each step and storing the calibration data in a memory, placing the ionization system in an operating mode, collecting real-time data regarding an output of the ionization system, comparing the real-time data to the calibration data and determining difference values therebetween, and using the difference values to determine the relative condition of the ionizer.

A further embodiment of the present invention comprises an apparatus for identifying the relative condition of an ionizer in an ionization system. The apparatus includes a calibrating module and a range module that steps the ionization system through one or more of a range of adjustments. A first collection module collects calibration data at each step and stores the calibration data in a memory. An operating module places the ionization system in an operating mode. A second collection module collects real-time data regarding an output of the ionization system. A comparison module compares the real-time data to the calibration data and determines difference values therebetween based on an operating point of the system, and uses the difference values to determine the relative condition of the ionizer.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 6 is a table of the baseline values and adjustment ranges for an ionization system in accordance with a preferred embodiment of the present invention.

DETAILED DESCRIPTION OF THE INVENTION

Figure 1:
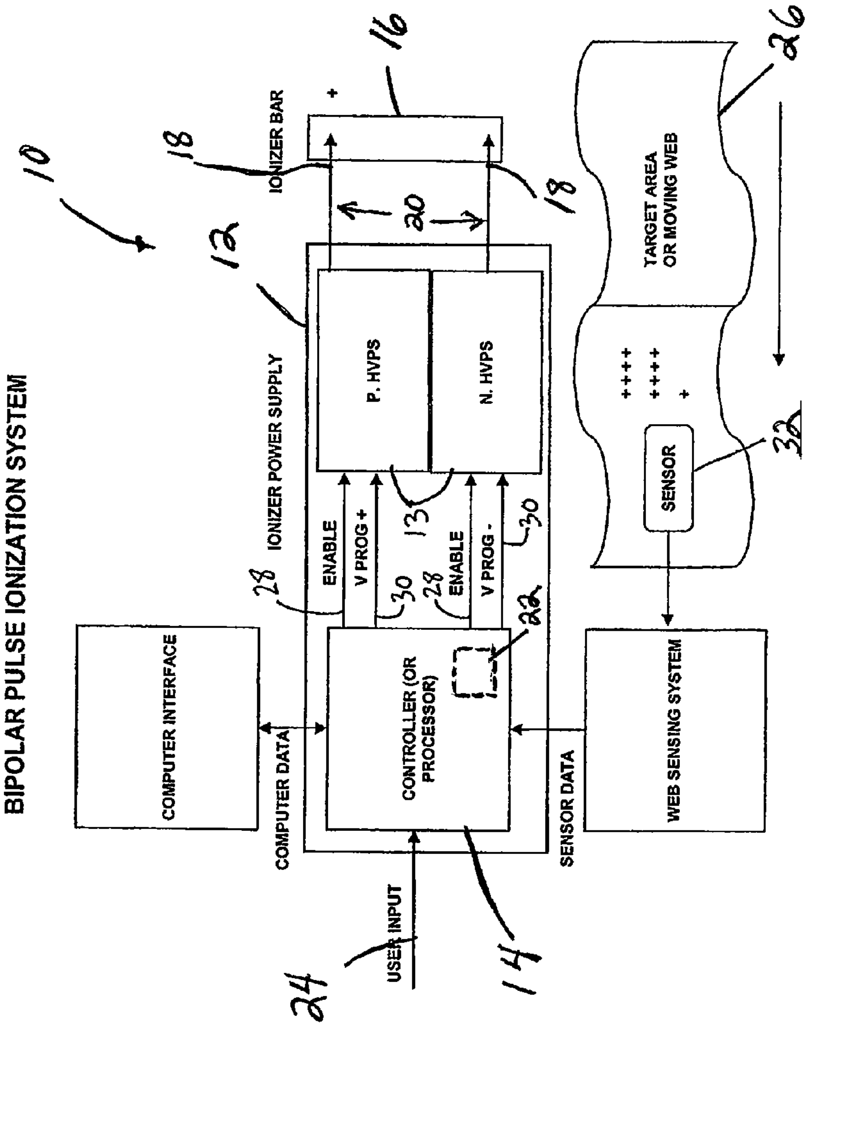
FIG. 1 is a schematic block diagram of a bipolar pulse ionization system in accordance with a preferred embodiment of the present invention.

Certain terminology is used herein for convenience only and is not to be taken as a limitation on the present invention. In the drawings, the same reference numbers are employed for designating the same elements throughout the several figures.

FIG. 1 is a schematic block diagram of an ionization device 10 according to one embodiment of the present invention. Examples of ionization devices include an electrostatic charging system, an ionization system, and an alternating current (AC) or direct current (DC) charge neutralizing system. The ionization device 10 includes an ionizer power supply 12, which includes at least one high voltage (HV) power supply 13. The HV power supply 13 may supply an AC or a DC voltage of about 3 kilo-Volts (kV) to about 60 kV. The ionizer power supply 12 further includes a controller or controller module 14 (for simplicity, hereinafter referred to as "controller 14"). In one preferred embodiment, the controller 14 is a microprocessor. In another preferred embodiment, the controller 14 is sensing circuitry. The ionization device 10 further includes at least one ionization emitter 16, illustrated as the ionizer bar in FIG. 1. The emitter 16 is connected to the ionizer power supply 12 by a connector system 18. The ionizer power supply 12 supplies an input voltage 20 to power the ionization emitter 16. The input voltage 20 may be described by operating parameters such as voltage level, current level, frequency, maximum voltage, minimum voltage, maximum current, minimum current, or pulse time. The connector system 18 may provide one or more properties of the emitter 16 to the controller 14 in the ionizer power supply 12, as described in copending U.S. application Ser. No. 11/763,270, entitled "High Voltage Power Supply Connector System," which is incorporated by reference herein. The controller 14 has detection logic 22 that controls one or more operating parameters of the HV power supply 13 to adjust to the correct settings for the connected emitter 16. In an alternative embodiment, the detection logic 22 may be included in the connector system 18 so that the connector system 18 directly modifies analog control voltages in the HV power supply 13 based on the properties provided in the connector system 18. If no emitter or ionizer bar 16 is detected, the HV power supply 13 preferably automatically shuts down the output voltage.

DC, Pulse, or AC ionization systems having HV power supplies and an ionizer typically have meter movements or bar graph displays to reflect the relative performance of the system. These types of indicators are important because as the ionizer runs, debris and dirt can collect and impair the ionizer's ability to neutralize charge. This debris may be either insulative or conductive, which respectively restricts or increases current flow from the ionizer bar. Systems that are currently available are manually adjusted using potentiometers, which can be confusing and or frustrating to the end user.

In accordance with one or more preferred embodiments of the present invention, developing an ionization system 10 with a controller 14 allows meter movement to be calibrated at the touch of a button. The controller 14 is preferably designed with adequate dynamic range for all applications and ranges. Fundamentally, the controller 14 preferably includes enough range to accurately collect data on bars of different lengths, where the current flow will be inherently different. To calibrate the meter movement, the controller 14 gathers base line information on the output of the ionization system 10. The ionizer power supply 12 is cycled through a range of internally stored operating points or steps. Values are recorded as a data point at each operating point or step, and are stored internally. Based on the values recorded, a scaling equation is developed and applied to the meter movement. The meter movement is controlled by the controller 14 using either wireless, digital ports, or an analog output. The range of adjustments may be one or a combination of the following operating modes: speed, hybrid, and distance.

In one or more preferred applications of this technique, baseline currents are measured and stored at multiple operating points. The meter movement is adjusted to read full scale at the baseline level. Relative increase and decrease from the baseline currents are shown on the meter as a decrease in level. Relative increases and decreases from the baseline currents are shown as a decrease regardless of whether there is an actual increase due to conductance or a decrease due to insulative debris on the ionizer. They are shown as such, because both types of debris result in the negative effect of impairing the ionizer's ability to neutralize charge. In a typical application, this assists the user by showing the decrease in the ionizer bar's efficiency due to either conductive or insulative debris or dirt. Other indicating displays are within the scope of the invention, such as a display that shows a relative level of debris or dirt from a baseline level, or other indicators of efficiency.

Referring again to FIG. 1, the ionizer power supply 12 receives an input 24 from one or more sources, including user input, sensor data, microprocessor data, or other remote data. The system response to the data from the user, sensor, or microprocessor collects data about the target area of neutralization 26. In a preferred embodiment an enable signal 28 sets the timing of the high voltage pulses. A Vprogram ± signal 30 sets the output level. In a preferred embodiment, a sensor 32 collects data about the target area of neutralization or the moving web.

Figure 2:
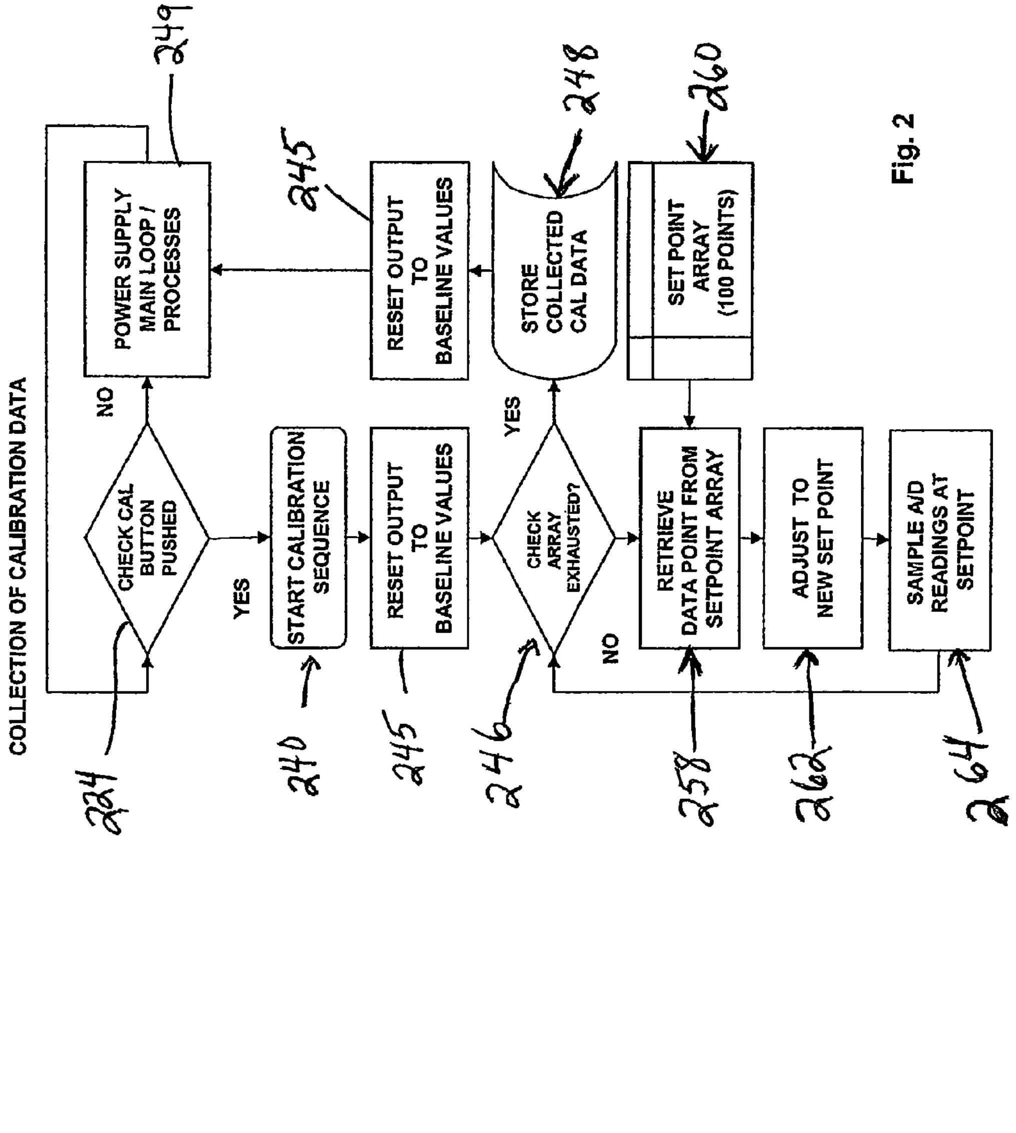
FIG. 2 is a flowchart associated with the collection of calibration data of an ionization system in accordance with a preferred embodiment of the present invention.

FIG. 2 is a flowchart illustrating the collection of calibration data. An input is received from a user, microprocessor, or other device coupled to or integral with the ionization system 10. In the example shown in the flowchart, a calibration button is pushed 224 to enter a calibration mode. Thereafter, a calibration module or sequence 240 is started. During this sequence, a plurality of baseline output currents of the ionizer are measured at one or more points of the high voltage power supply to the ionizer. These output measurements are compiled as the baseline calibration data at each of the points measured. The points measured are set points which are preprogrammed or can be programmed by a user, microprocessor, or other connector system coupled or integral to the ionization system. The set points in memory cover all setting ranges, preferably by uniformly dividing the range and determining the set points. In one embodiment, 250 set points were stored in a memory for compiling the baseline currents data. The baseline currents are measured and stored at each point 248.

Referring to FIGS. 1 and 2, an input is received that initiates calibration of the baseline data of the ionization bar selected. In a preferred embodiment, the calibration sequence is started 240, and the output current of the ionizer at a plurality of points is measured and stored at each point. The points, or set points, are retrievable from memory or from an input source 258. The set points cover all setting ranges. To cover all setting ranges, the range is uniformly divided and the set points are determined. In a preferred embodiment, a range of 100-300 set points are measured and stored, as set point array 260. In a more preferred embodiment, 250 set points are measured and stored. The power supply is set to each of the points 262 and data is sampled at each of the points 264. The data is collected to compile baseline values for the ionizer bar selected. When there is no more set points to implement 246, and the data is collected at each of the points, the calibration data is stored 248. In other preferred embodiments, the data is stored throughout the collection process. This process calibrates the power supply to the ionizer selected. In a preferred embodiment, during calibration the process of responding to user, sensor, or microprocessor inputs is suspended. In addition, during this calibration the output values of the current are reset to the baseline values for the ionizer bar selected 245. The power supply then returns to its normal operation 249.

Figure 3:
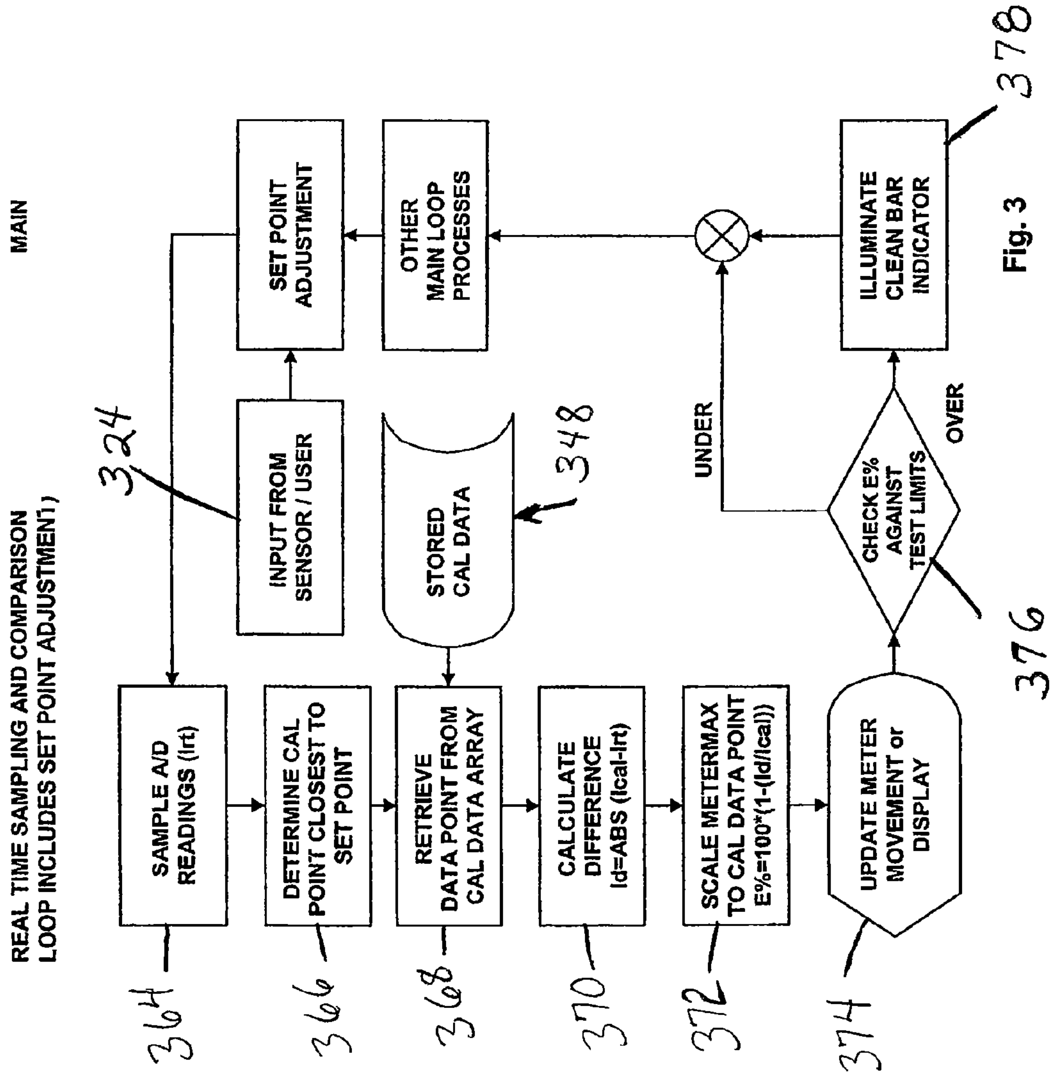
FIG. 3 is a flowchart associated with the collection of real time sampling and comparison process with set point adjustments of an ionization system in accordance with preferred embodiments of the present invention.
Figure 4:
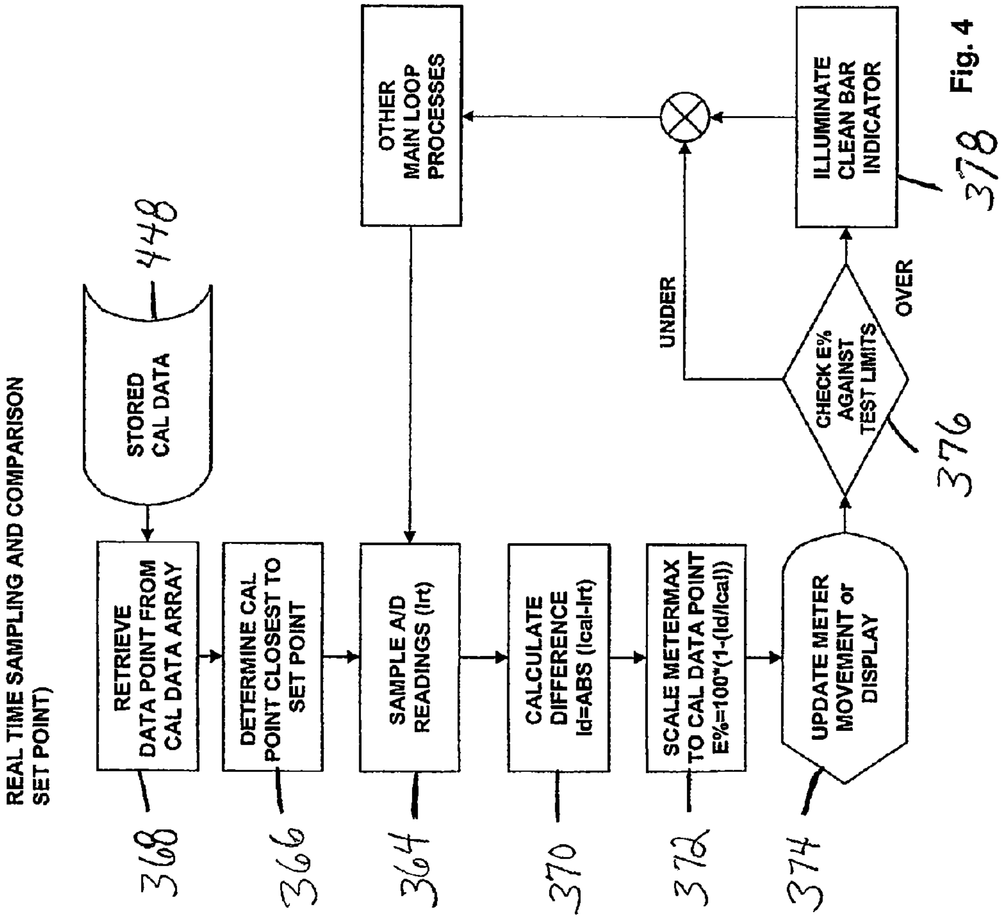
FIG. 4 is a flowchart associated with the collection of real time sampling and comparison process with fixed set points of an ionization system in accordance with preferred embodiments of the present invention.

FIG. 3 is a flowchart associated with a second collection module, which is a collection of real time sampling, and is also associated with a comparison module, or comparison process, with the set point adjustments of an ionization system in accordance with preferred embodiments of the present invention. In FIG. 3, there is a set point adjustment in the loop such that stored calibration data is recalled during each loop. The data point that is recalled is the point that is acquired with the power supply closest to the applied set point, or operating point. FIG. 4 is a flowchart associated with the collection of real time sampling and comparison process with fixed set points such that there is only one stored calibration value 448 that is used, i.e., the one closest to the fixed set point, or operating point 366. Substantially similar steps in FIGS. 3 and 4 are represented with the same reference numerals. In accordance with the preferred embodiments of the present invention, the power supply constantly samples the analog to digital readings 364. The sampling may be constant or intermittent. Based on the set point measured, the calibration data is retrieved 368 for that set point from the baseline values stored for that set point. An absolute percentage difference is calculated 370 from the stored value and the real time reading at the set point. In a preferred embodiment, the retrieved $I_{cal}$ is the base line calibration measurement at that set point. The retrieved $I_{cal}$ is assigned a value of 100%. An error from the 100% is calculated. In a preferred embodiment the calculation used to determine the difference is:

$$I_D=[I_{Cal}-I_{rt}]$$

where $I_D$ is the absolute value of base line calibration measurement ($I_{cal}$) minus the real-time measurement ($I_{rt}$). The percentage difference E % from the baseline calibration is calculated 372 by the following equation:

$$E\,\%=100*(1-(I_D/I_{cal})$$

Upon calculation of the percentage difference, the meter or display of the ionizer power supply is updated 374. The user interface connected to the ionizer power supply is also updated to display the percentage difference E %. The percentage difference E % is compared against threshold limits for the ionizer bar selected 376. A clean bar indicator is illuminated when the threshold limit is exceeded 378. In various preferred embodiments of the present invention, the threshold for the limit wherein the ionizer bar should be cleaned can be configured by the user, a sensor, a microprocessor, or set by software coupled to or located within the ionizer power supply. In a preferred embodiment of the present invention, the current is monitored on the display and the clean bar indicator is illuminated when the current has deviated by an E % of 60% from the calibration value of $I_{cal}$.

Figure 5:
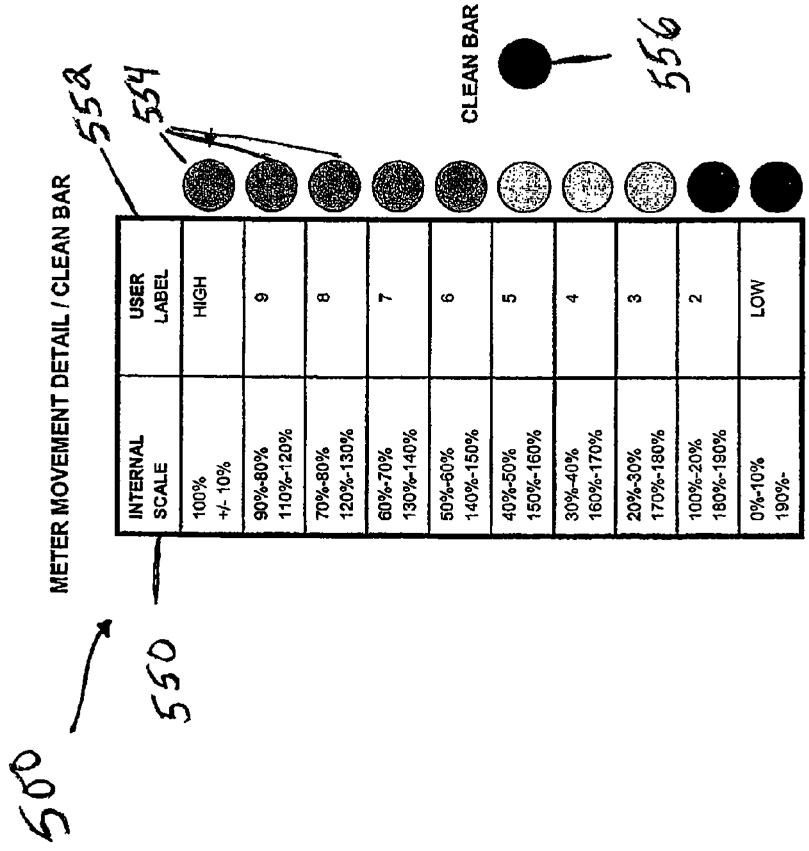
FIG. 5 is an illustration of the meter movement of an ionization system accordance with a preferred embodiment of the present invention.

FIG. 5 is an illustration of the meter movement of an ionization system. FIG. 5 illustrates one preferred user interface 500 that displays meter movement detail and the clean bar indicator of the present invention. In the meter movement indicator of FIG. 5, an internal percentage scale 550 is displayed on the far right and numbers are assigned to the internal percentage scale which indicate on a simple numerical scale 552 the priority from low to high of the deviations from the baseline calibrations of the ionizer to the real time outputs of the ionizer. As the percentage difference increases, the series of indicator lights 554 illuminate from lowest to highest. When the point percentage difference exceeds a threshold limit, the clean bar light 556 is illuminated. When the ionizer bar is cleaned, the system is reset. In some preferred embodiments, the system can be reset without cleaning of the ionizer bar.

FIG. 6 is a table 600 of the baseline values and adjustment ranges for an ionization system. In the preferred embodiments of the present invention, the power supply configures the ionizer bar type that is attached. In a preferred embodiment, the power supply automatically configures the bar type attached using a connector system. In this embodiment, the ionizer bar types have different pin spacings optimized for different operating distances. The power supply runs the bars at different frequencies and output voltages as indicated in the table 600 of FIG. 6. Before beginning the calibration, the ionizer bar should be installed in the desired location. During the calibration, the analog to digital readings are gathered. These readings reflect the performance of the bar in the new condition, or base line condition, and account for other factors of the installation. For example, one such factor would be proximity of the bar to grounded metal surfaces. Other factors that are considered and compensated for include the ionizer bar length. Shorter bars have fewer emitter pins and operate at lower currents, while longer bars have more pins and operate at higher currents. During the automatic calibration cycle, this factor is accounted for and, if necessary, corrected in the baseline data. Since the ionizer power supply measures the performance of the ionizer bar when it is installed, the ionizer power supply can use the calibration to scale the meter movement of FIG. 5, including user interface or user displays, automatically. There is no need to adjust the potentiometers or otherwise "tweak" the power supply.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of determining a relative condition of an ionizer in an ionization system, the method comprising:

a) placing the ionization system in a calibration mode;

b) stepping the ionization system through one or more of a range of adjustments;

c) collecting calibration data at each step and storing the calibration data in a memory;

d) placing the ionization system in an operating mode;

e) collecting real-time data regarding an output of the ionization system;

f) comparing the real-time data to the calibration data and determining difference values therebetween; and g) using the difference values to determine the relative condition of the ionizer.

2. The method of claim 1 wherein the output is an output current of the ionization system.

3. The method of claim 1 wherein one of the range of adjustments is an output voltage of the ionization system.

4. The method of claim 1 wherein one of the range of adjustments is a duty cycle of the ionization system.

5. The method of claim 1 wherein one of the range of adjustments is a frequency of the ionization system.

6. The method of claim 1 wherein the ionization system is stepped through at least two ranges of adjustments, including an output voltage of the ionization system and a duty cycle of the ionization system.

7. The method of claim 1 further comprising:

using the difference value to control an indicator of the relative ionizer condition.

8. The method of claim 1 wherein the memory is a non-volatile memory, the calibration data thereby remaining stored even if power to the ionizer is turned off.

9. The method of claim 1 wherein the ionizer includes one or more ionizing pins, the method further comprising: repeating steps (a)-(g) after the ionizing pins are cleaned.

10. The method of claim 1 wherein the ionizer is a neutralizing ionizer.

11. The method of claim 1 wherein the calibration is received from a user interface.

12. The method of claim 1, wherein in step (f) the comparison of the real time data to the calibration data occurs using a calibration value of the collected calibration data that is closest to an operating point of the ionization system.

13. The method of claim 1, wherein in step (f) the comparison of the real time data to the calibration data occurs using a stored calibration value that is a fixed set point.

14. An apparatus for identifying the relative condition of an ionizer in an ionization system, comprising:

a) a calibrating module;

b) a range module that steps the ionization system through one or more of a range of adjustments;

c) a first collection module that collects calibration data at each step and stores the calibration data in a memory;

d) an operating module that places the ionization system in an operating mode;

e) a second collection module that collects real-time data regarding an output of the ionization system; and f) a comparison module that compares the real-time data to the calibration data and determines difference values therebetween based on an operating point of the system, and uses the difference values to determine the relative condition of the ionizer.

15. The apparatus of claim 14, wherein the output is an output current of the ionization system.

16. The apparatus of claim 14, wherein one of the range of adjustments is an output voltage of the ionization system.

17. The apparatus of claim 14, wherein one of the range of adjustments is a duty cycle of the ionization system.

18. The apparatus of claim 14, wherein one of the range of adjustments is a frequency of the ionization system.

19. The apparatus of claim 14, wherein the range module steps the ionization system through at least two ranges of adjustments, including an output voltage of the ionization system and a duty cycle of the ionization system.

20. The apparatus of claim 14, wherein the difference value of the comparison module is used to control an indicator of the relative ionizer condition.

21. The apparatus of claim 14, wherein the memory is a non-volatile memory, the calibration data thereby remaining stored even if power to the ionizer is turned off.

22. The apparatus of claim 14, wherein the ionizer includes one or more ionizing pins.

23. The apparatus of claim 14, wherein the ionizer is a neutralizing ionizer.

24. The apparatus of claim 14, wherein the calibration data is received from a user interface.

25. The apparatus of claim 14, wherein the comparison module recalls for comparison a calibration value of the collected calibration data that is closest to an operating point of the ionization system.

26. The apparatus of claim 14, wherein the comparison module recalls for comparison a stored calibration value that is a fixed set point.

* * * * *